United States Patent [19]

Anderson

[11] 3,737,331

[45] June 5, 1973

[54] THORIA-YTTRIA-BASED CERAMIC MATERIALS

[75] Inventor: Richard C. Anderson, Chagrin, Ohio

[73] Assignee: General Electric Company, Schenectady, N.Y.

[22] Filed: Mar. 26, 1971

[21] Appl. No.: 128,511

[52] U.S. Cl..................106/39 R, 136/86 F, 313/221
[51] Int. Cl. ................................................C04b 33/00
[58] Field of Search........................106/39 R; 23/21, 23/254; 264/56, 65, 82; 252/301.4; 313/221, 117; 136/86 F

[56] References Cited

UNITED STATES PATENTS

| | | | |
|---|---|---|---|
| 3,400,054 | 9/1968 | Ruka et al. | 136/86 F |
| 3,615,756 | 10/1971 | Jorgensen | 106/39 R |
| 3,545,987 | 12/1970 | Anderson | 106/39 R |
| 3,574,645 | 4/1971 | Anderson | 106/39 R |

OTHER PUBLICATIONS

Kingery, W. D.; Thoria, in Ceramic Fabrication Processes; New York, 1958 p. 152 (TP807K5)

Morgan, C. S.; Material Transport in Sintering; in Chemical Abstracts, 64:15545f (QD1A51)

Curtis, C. E.; Properties of Yttrium Oxide Ceramics, in J. Amer. Cer. Soc., 40 (1957) pp. 274–278 (TP785A62)

Wachtman, I. B.; Mechanical & Electrical Relaxation in $ThO_2$ Containing CaO; in Phys. Rev.; 131 (2) pp. 517–527 (QC1P4)

*Primary Examiner*—Hyland Bizot
*Assistant Examiner*—W. R. Satterfield
*Attorney*—Paul A. Frank, Charles T. Watts, Gerhard K. Adam, Frank L. Neuhauser, Oscar B. Waddell and Joseph B. Forman

[57] ABSTRACT

High density thoria-based ceramic materials are provided consisting essentially in mole percent as calculated from the batch on the oxide basis of 78–96% $ThO_2$, 2–20% $Y_2O_3$ and 0.5–5.0% CaO. These materials may be prepared by pressing the mixed powders and sintering them in a hydrogen atmosphere until about theoretical density is obtained.

5 Claims, No Drawings

THORIA-YTTRIA-BASED CERAMIC MATERIALS

My copending application Ser. No. 807,994 filed Mar. 17. 1969, now U.S. Pat. No. 3,574,645, relates to transparent thoria-based ceramics containign additions of from about 0.5-5.0 mole percent of yttrium oxide. I have now discovered a high-density thoriabased ceramic material which can be fabricated into immersible oxygen sensor tubes that are resistant to attack by molten sodium. The novel ceramic material is incorporated in a high-temperature solid-electrolyte galvanic cell which can be applied as an oxygen probe capable of measuring oxygen potentials between −30 and −165 kcal/mole $O_2$ (at 750° C.).

In accordance with the present invention, I have discovered a high-density polycrystalline thoria-based ceramic material consisting essentially in mole percent as calculated from the batch on the oxide basis of 78-96% $ThO_2$, 2-20% $Y_2O_3$ and 0.5-5.0% CaO. These materials may be sintered to full theoretical density at relatively low temperatures, e.g. 1,800° C. and below, when sintering is accomplished in a hydrogen atmosphere and in the presence of trace amounts $Al_2O_3$ vapors.

Thorium oxide ($ThO_2$) has a fluorite-type of cubic structure and has a theoretical density of 10.001 gm/cm$^3$. Its melting point is 3,220° C., the highest of the oxides. The amount of thorium oxide useful in preparing the composition of the present invention is 78-96 mole percent as calculated from the batch on the oxide basis. The $ThO_2$ should be of high purity (99.9 percent) to avoid contamination of the final product.

The yttrium oxide ($Y_2O_3$) useful in the composition is 2-20 mole percent as calculated from the batch on the oxide basis. This ingredient not only helps in lowering the sintering temperature, but also imparts desirable electrical properties for use in a high-temperature oxygen sensor. The preferred amount of $Y_2O_3$ is about 10-20 mole percent. The $Y_2O_3$ may be added as the high purity oxide (99.9 percent) or as one of its salts, e.g. $Y(NO_3)_3 \cdot 6H_2O$ (99.9 percent purity).

The CaO acts as a sintering aid and is useful in amounts of 0.5-5.0 mole percent optimum being about 2 mole percent. This ingredient should also be of high purity (99.9 percent). It can be added as a pure powder or can be used as reagent grade $Ca(NO_3)_2 \cdot 4H_2O$. When the amount of CaO is less than that specified, its effectiveness is lost, while greater amounts interfere with the electrical properties of the ceramic materials for use in the high-temperature oxygen sensor.

The presence of trace amounts of $Al_2O_3$ up to about 0.5 mole percent may also be advantageous. The $Al_2O_3$ addition can be in the form of vapors given off by the furance tube. Thus the $Al_2O_3$ vapors may act in such a manner that a very thin aluminate layer forms around the ceramic grains.

The process by which the ceramic bodies are produced comprises preparing the basic ingredients in the proper proportions, thoroughly mixing the ingredients, pressing the powdered oxides into "green bodies" and then firing or sintering the "green bodies" in a hydrogen atmosphere for a time sufficient to effect densification.

My invention is further illustrated by the following examples:

EXAMPLE I

A high density thoria-based ceramic composition was prepared from the following formulation:

| Ingredient | Mole % | Weight % |
|---|---|---|
| $ThO_2$ | 82 | 85.32 |
| $Y_2O_3$ | 16 | 14.24 |
| CaO | 2 | 0.44 |

The formulation was prepared by mixing the following batch ingredients (99.9 purity) per 100 grams of material. Into a glass beaker equipped with a Teflon coated stirring bar was added 200 ml. distilled $H_2O$, 1.90 g. $Ca(NO_3)_2 \cdot 4H_2O$ and 6.0 g. $Y(NO_3)_3 \cdot 6H_2O$ until the nitrates dissolved. After filtration, 12.46 g. of $Y_2O_3$ and then 85.32 g. of $ThO_2$ were added to the solution with continuous stirring. The solution was heated until the slurry became too thick to be stirred by the magnetic bar and the slurry was then transferred to an oven at 110° C. until dried. The dry powder was crushed and screened through a 100 mesh (U.S. Standard) nylon screen. Thereafter the screened powder was calcined at 700° C. for 6 hours and cooled.

Tubes were fabricated by isostatically pressing the powder around a steel mandrel at 30,000 psi. The tubes were then machined on the same mandrel used for pressing.

Using a molybdenum wire wound alumina muffle furance, the "green ware" was fired at a temperature of 1,600° C. in the presence of a hydrogen atmosphere for 6 hours. Shrinkage during firing mounted to about 17-18 percent by volume.

The ceramic product obtained was substantially pore-free and was sintered to about its theoretical density. The tubes also were substantially leak tight to helium.

EXAMPLE II

A disc-shaped article was prepared from a high-density thoria-based composition having the following formulation:

| Ingredient | Mole % | Weight % |
|---|---|---|
| $ThO_2$ | 96 | 97.9 |
| $Y_2O_3$ | 2 | 1.67 |
| CaO | 2 | 0.43 |

The thoria 0.334 g. (as a calcined sulfate), 1.3 g. of $Y(NO_3)_3 \cdot 6H_2O$, and 0.372 g. $Ca(NO_3)_2 \cdot 4H_2O$ were added to 100 ml. distilled water. The mixture was stirred with a magnetic stirrer overnight, evaporated to dryness with stirring, and then dried in an oven at 110° C. The dried material was screened through a 100 mesh nylon screen and the powder was calcined for 3 hours at 700° C. A 1 inch dimaeter disc was die pressed at 5,000 psi and then isostatically pressed at a pressure of 50,000 psi.

When the pill is fired at temperatures up to 1,800° C. in a hydrogen atmosphere a body having the desired electrical properties and approximately theoretical density is obtained.

It will be appreciated that the invention is not limited to the specific details shown in the examples and illustrations and that various modifications may be made within the ordinary skill in the art without deparing from the spirit and scope of the invention.

I claim:

1. As an article of manufacture, a sintered high-density polycrystalline thoria-based ceramic body consisting essentially in mole percent as calculated from the batch on the oxide basis of 78–96% $ThO_2$, 2–20% $Y_2O_3$, and 0.5–5.0% CaO, said body being substantially pore-free, leak tight to helium gas and resistant to attack by molten sodium.

2. The ceramic body of claim 1, containing additionally $Al_2O_3$ in trace amounts of up to about 0.5 mole percent.

3. The ceramic body of claim 1, consisting essentially in mole percent as calculated from the batch on the oxide basis of 10–20% $Y_2O_3$, 0.5–5.0% CaO and the remainder $ThO_2$.

4. The ceramic body of claim 1, consisting essentially in mole percent as calculated from the batch on the oxide basis of 82% $ThO_2$, 16% $Y_2O_3$ and 2% CaO.

5. The ceramic body of claim 1, consisting essentially in mole persent as calculated from the batch on the oxide basis of 96% $ThO_2$, 2% $Y_2O_3$ and 2% CaO.

* * * * *